(12) United States Patent
Uno

(10) Patent No.: US 7,119,707 B2
(45) Date of Patent: Oct. 10, 2006

(54) CIRCUIT FOR PROVIDING ELECTRICAL CURRENT TO A BICYCLE DEVICE

(75) Inventor: Kouji Uno, Osaka (JP)

(73) Assignee: Shimano, Inc., Osaka (JP)

(*) Notice: Subject to any disclaimer, the term of this patent is extended or adjusted under 35 U.S.C. 154(b) by 488 days.

(21) Appl. No.: 10/618,343

(22) Filed: Jul. 10, 2003

(65) Prior Publication Data
US 2004/0051375 A1    Mar. 18, 2004

(30) Foreign Application Priority Data
Jul. 15, 2002    (JP)    ............................... 2002-205721

(51) Int. Cl.
| G08B 5/36 | (2006.01) |
|---|---|
| G01R 31/00 | (2006.01) |
| G01R 15/22 | (2006.01) |
| H05B 37/02 | (2006.01) |
| G09F 9/33 | (2006.01) |
| G09F 9/35 | (2006.01) |

(52) U.S. Cl. ........................... 340/815.45; 340/815.52; 340/815.75; 324/403

(58) Field of Classification Search ................ 324/403; 340/815.52, 815.75
See application file for complete search history.

(56) References Cited

U.S. PATENT DOCUMENTS 4,379,237 A * 4/1983 Mosteller, Jr. .............. 307/141
4,727,308 A    2/1988 Huljak et al.
5,818,172 A * 10/1998 Lee .............................. 315/86
5,998,928 A * 12/1999 Hipp ........................... 315/77

FOREIGN PATENT DOCUMENTS

| DE | 3146328 A1 | 6/1983 |
|---|---|---|
| DE | 3832109 A1 | 3/1990 |
| DE | 19948798 A1 | 5/2001 |
| FR | 2763203 A1 | 11/1998 |
| GB | 2126438 A | 3/1984 |

OTHER PUBLICATIONS

Patent Abstracts of Japan, vol. 5, No. 159 (E-077), Oct. 14, 1981; for JP 56-087384 A (Fujitsu Ltd.), published Jul. 15, 1981.
Patent Abstracts of Japan, vol. 11, No. 174 (E-513), Jun. 4, 1987; for JP 62-007175 A (Hitachi Ltd.), published Jan. 14, 1987.
"Power Control For Battery-Electric Bicycles," Aerospace & Electronics Conference, 1993; NAECON 1993; Proceedings of the IEEE 1993 National, Dayton, OH, USA, May 24-28, 1993, New York, NY, USA, IEEE, US, May 24, 1993, pp. 428-434, XP010115980, ISBN: 0-7803-1295-3.

* cited by examiner

Primary Examiner—Stephen W. Jackson
Assistant Examiner—Hal I. Kaplan
(74) Attorney, Agent, or Firm—James A. Deland

(57) ABSTRACT

A circuit for providing electrical current to an electrically operated bicycle device comprises a current supply circuit that supplies DC current from the power supply to the bicycle device along a current path and a current limiting circuit that includes an active resistance circuit that limits electrical current flowing through the current supply circuit when voltage applied to the current limiting circuit is above a minimum value.

26 Claims, 14 Drawing Sheets

FIG. 7

| A1 MODE | 1ST SPEED | 2ND SPEED | 3RD SPEED |
|---|---|---|---|
| UPWARD THRESHOLD VALUE (km/h) | 16.7 | 22.6 | |
| DOWNWARD THRESHOLD VALUE (km/h) | | 15.2 | 20.7 |

| A2 MODE | 1ST SPEED | 2ND SPEED | 3RD SPEED |
|---|---|---|---|
| UPWARD THRESHOLD VALUE (km/h) | 12.7 | 17.1 | |
| DOWNWARD THRESHOLD VALUE (km/h) | | 11.5 | 15.6 |

| A3 MODE | 1ST SPEED | 2ND SPEED | 3RD SPEED |
|---|---|---|---|
| UPWARD THRESHOLD VALUE (km/h) | 9.6 | 12.9 | |
| DOWNWARD THRESHOLD VALUE (km/h) | | 8.7 | 11.8 |

— # CIRCUIT FOR PROVIDING ELECTRICAL CURRENT TO A BICYCLE DEVICE

BACKGROUND OF THE INVENTION

The present invention is directed to bicycles and, more particularly, to bicycle devices that include an electrical component powered by a power supply.

Bicycle-mounted gearshift systems, and automatic gearshift systems in particular, comprise running condition (e.g., speed) detecting means for detecting the running condition of the bicycle, a gearshift apparatus, and gearshift control means for upshifting and downshifting the gearshift apparatus in accordance with the running condition of the bicycle. The gearshift control means typically comprises a motor or other electronic actuating device that automatically operates the gearshift apparatus. The electrical components usually are powered by a common DC power supply such as a dynamo or secondary cell. Bicycle computers used with such systems often have a liquid crystal display (LCD), for example, for displaying various types of information to the rider. Such information may include time, the bicycle speed, running distances, cadence (crank RPM), the gearshift position, and other information related to the running conditions.

Because the surrounding brightness differs between daytime and nighttime, there are cases when it is convenient to have the display operate differently when riding the bicycle at these times. For example, at night it is more difficult to view the display, so some bicycle computers are equipped with a backlight. The backlight may comprise a reflective panel disposed behind the liquid crystals of the display, and a light-emitting diode (LED) that directs light onto the reflective panel.

SUMMARY OF THE INVENTION

The present invention is directed to bicycle devices that include an electrical component powered by a power supply. In one embodiment, a circuit for providing electrical current to a bicycle device comprises a current supply circuit that supplies DC current from the power supply to the bicycle device along a current path and a current limiting circuit that includes an active resistance circuit that limits electrical current flowing through the current supply circuit when voltage applied to the current limiting circuit is above a minimum value. Additional inventive features will become apparent from the description below, and such features alone or in combination with the above features may form the basis of further inventions as recited in the claims and their equivalents.

BRIEF DESCRIPTION OF THE DRAWINGS

FIG. 7 is a series of tables showing the shifting characteristics for various automatic shifting modes;

DETAILED DESCRIPTION OF THE EMBODIMENTS

Figure 1:
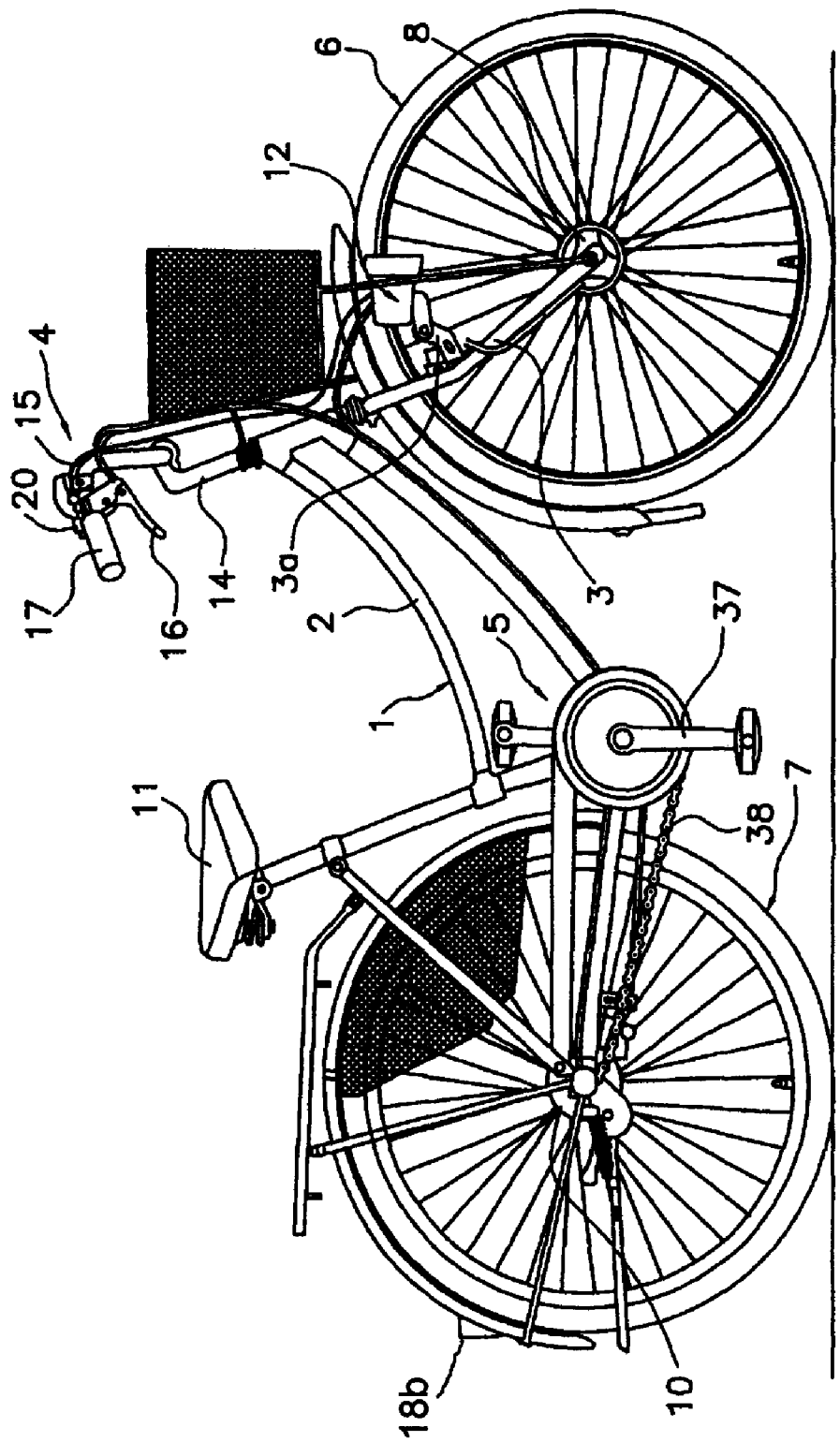
FIG. 1 is a side view of a bicycle that includes particular embodiments of illumination-controlled devices.

FIG. 1 is a side view of a bicycle that includes particular embodiments of illumination-controlled devices. This bicycle is a light roadster recreational bicycle comprising a frame 1 having a double-loop frame body 2 formed from welded tubes, a front fork 3 mounted to the frame body 2 for rotation around a diagonal axis, a handle component 4, a drive component 5, a front wheel 6 on which a dynamo hub 8 with brakes is mounted, a rear wheel 7 on which an internal shifting hub 10 is mounted, a saddle 11, a shift control unit 12 to control shifting of the internal shifting hub 10, and a shift controller 20 for manually operating the shift control unit 12. A tail light 18b is mounted on the rear of frame body 2.

Figure 2:
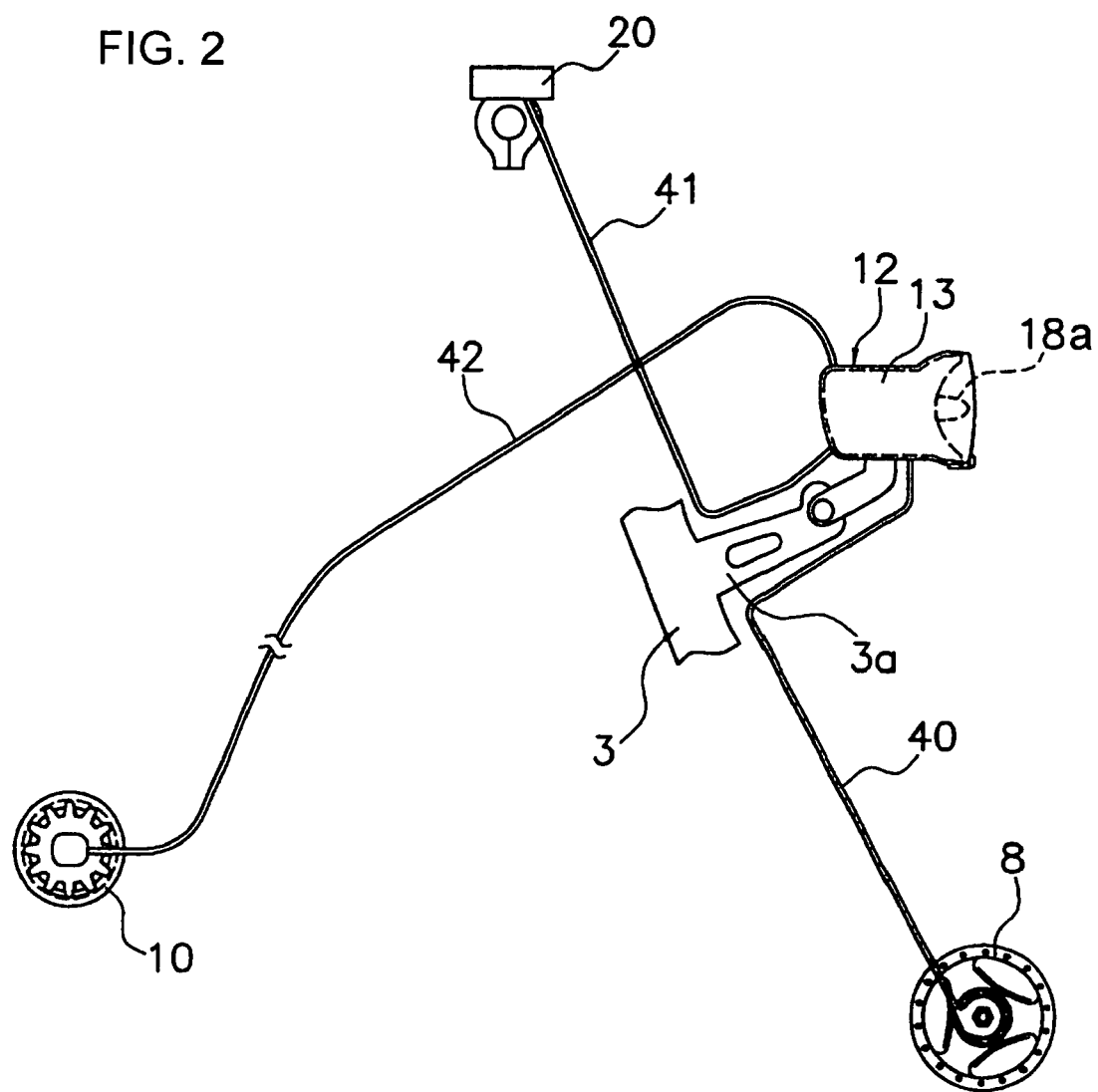
FIG. 2 illustrates how a shift controller, a shift control unit, a dynamo and a transmission are coupled together.

The handle component 4 comprises a handle stem 14, fastened to the upper part of the front fork 3, and a handlebar 15 fastened to the handle stem 14. Brake levers 16 and grips 17 are mounted on both ends of the handlebar 15. In this embodiment, the shift controller 20 is integrated with the right-side brake lever 16. The drive component 5 comprises a crank 37, mounted on the lower part (bottom bracket component) of the frame body 2, and a chain 38 that engages the crank 37 and the internal shifting hub 10. The internal shifting hub 10 is capable of producing three speed steps, including a low speed step (speed 1), an intermediate speed step (speed 2), and a high speed step (speed 3). These three speed steps can be selected by means of a motor unit 29 (FIG. 3) in the shift control unit 12. The dynamo hub 8 of the front wheel 6 can be fitted with a roller-type front brake, and it houses an alternating current dynamo 19 (FIG. 6) that generates electricity in response to the rotation of the front wheel 6. As shown in FIG. 2, the shift control unit 12 is electrically connected to the alternating current dynamo 19 housed in the dynamo hub 8 by electrical wiring 40, and it is electrically connected to the shift controller 20 by electrical wiring 41. Placing the dynamo 19 within hub 8 reduces pedaling resistance because the dynamo is mounted near the hub axle. The shift control unit 12 is mechanically connected to the internal shifting hub 10 by a shift control cable 42.

Figure 3:
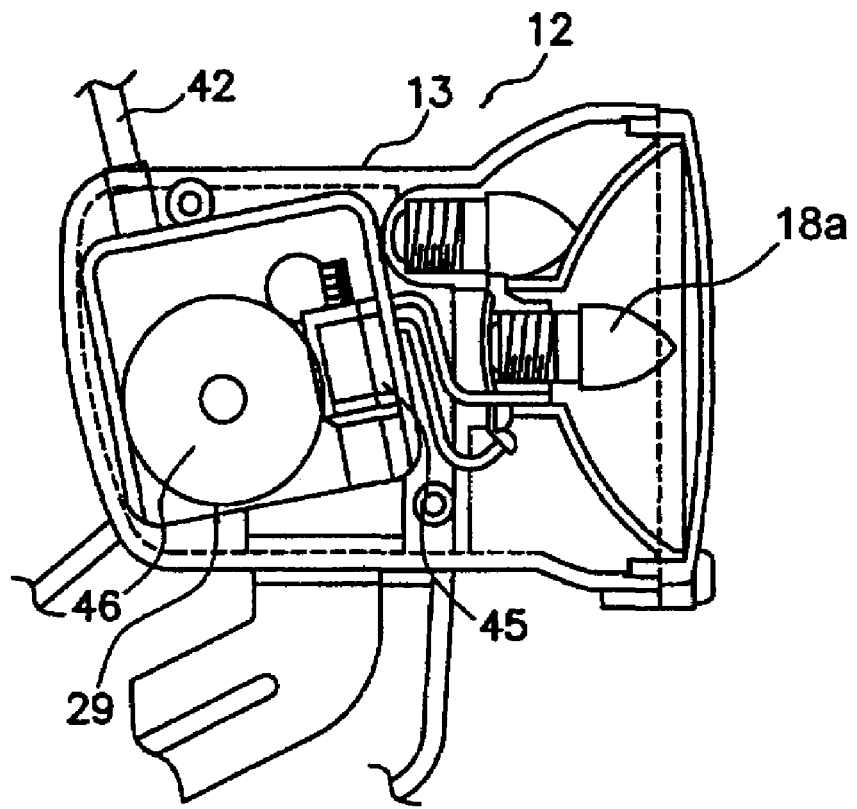
FIG. 3 is a side cross sectional view of the shift control unit shown in FIG. 2.
Figure 4:
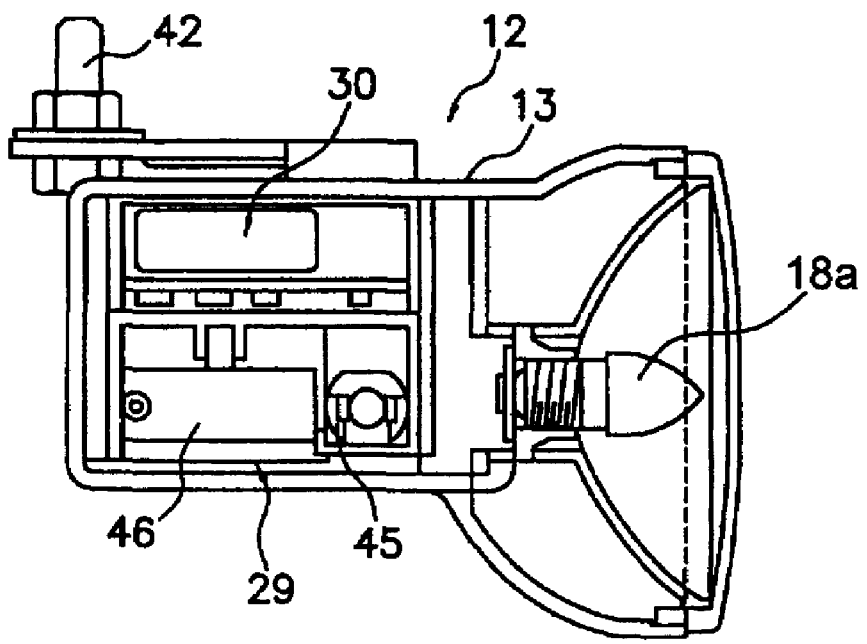
FIG. 4 is a top cross sectional view of the shift control unit shown in FIG. 2.

As shown in FIGS. 3 and 4, the shift control unit 12 comprises a headlight case 13 mounted to a headlight stay 3a located midway along the front fork 3 for housing a headlight 18a. The motor unit 29 and a circuit unit 30 are housed in the headlight case 13. The motor unit 29 comprises an electric shifting motor 45, a cable operating component 46 which moves into three shifting positions by means of the shifting motor 45, and a position sensor 47 (FIG. 6) to detect the shift position of the cable operating component 46. One end of the shift control cable 42 is connected to this cable operating component 46. This arrangement facilitates waterproof construction, since no electrical wires are needed between the shift control unit 12 and the internal shifting hub 10 or headlight 18a. Furthermore, all of these components are mounted to the front of the bicycle, where they do not interfere with riding. The circuit unit 30 comprises a control element 25 (FIG. 6) containing a microcomputer comprising a CPU, RAM, ROM, and an I/O interface.

Figure 5:
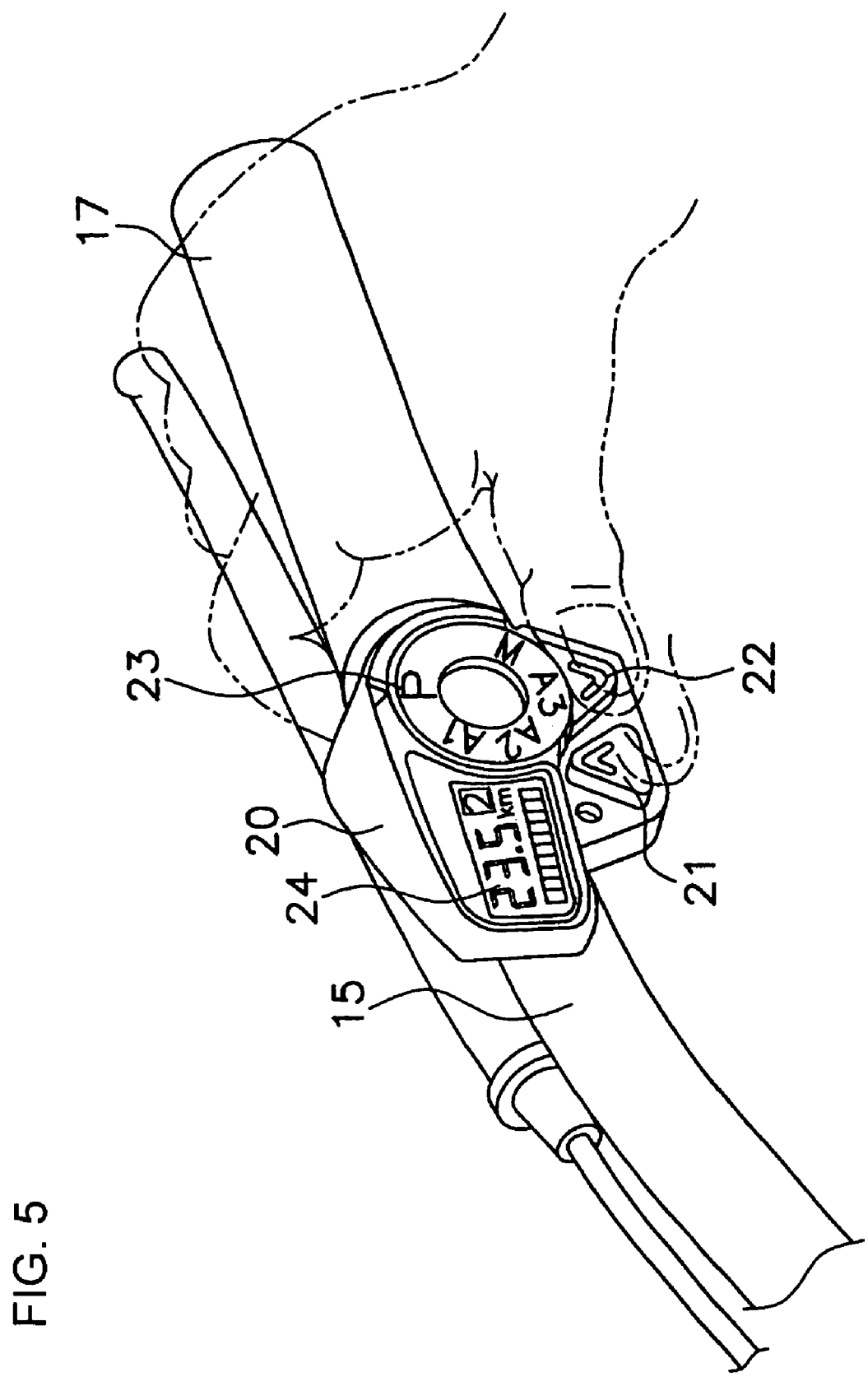
FIG. 5 is a perspective view of the shift controller.

As shown in FIG. 5, the shift controller 20 comprises two operating buttons 21 and 22 in the form of triangular pushbuttons disposed next to each other, an operating dial 23 disposed above the operating buttons 21 and 22, and a liquid crystal display device 24 disposed to the left of the operating dial 23. The operating button 21 on the left side is for manually shifting from the low speed step to the intermediate speed step and to the high speed step. The operating button 22 on the right side is for manually shifting from the high speed step to the intermediate speed step and to the low speed step. The operating dial 23 is used for switching between a manual shifting mode (M), three automatic shifting modes (A1–A3), and a parking mode (P) using five detent positions. The three automatic shifting modes (A1–A3) are modes for automatically shifting the internal shifting hub 10 according to a bicycle speed signal derived from the alternating current dynamo 19 in a manner described below. The manual shifting mode (M) is a mode for manually shifting the internal shifting hub (10) using the operating buttons 21 and 22, and the parking mode (P) is a mode for locking the internal shifting hub (10).

The three automatic shifting modes (A1–A3) are designed to allow shift timing (i.e., the threshold speed values at which shifting will occur) to be automatically changed during upshifting (shifting from low speed to high speed) or downshifting (shifting from high speed to low speed). The speed threshold values for the various modes are shown in FIG. 7. The upward and downward shift timings gradually decrease from automatic shifting mode (A1) through automatic shifting mode (A3) such that automatic shifting mode (A1) shifts at the highest speed, and automatic shifting mode (A3) shifts at the lowest speed. Furthermore, the spacing of the threshold values decreases from automatic shifting mode (A1) to automatic shifting mode (A3). It is usually preferable to set the shift controller to automatic shifting mode (A2). When automatic shifting mode (A2) is selected, for example, the internal shifting hub 10 is upshifted from speed 1 to speed 2 when the bicycle speed reaches 12.7 km/h. Similarly, the internal shifting hub 10 is upshifted to speed 3 when the bicycle speed reaches 17.1 km/h. On the other hand, when the bicycle speed later falls to 15.6 km/h, the internal shifting hub 10 is downshifted to speed 2, and again downshifted to speed 1 when the bicycle speed falls to 11.5 km/h. Between upshift timing and downshift timing, downshift timing is set as the lower of the two to prevent chattering during shifting. For climbing hills, a mode may be set according to the steepness of the hill.

Figure 6:
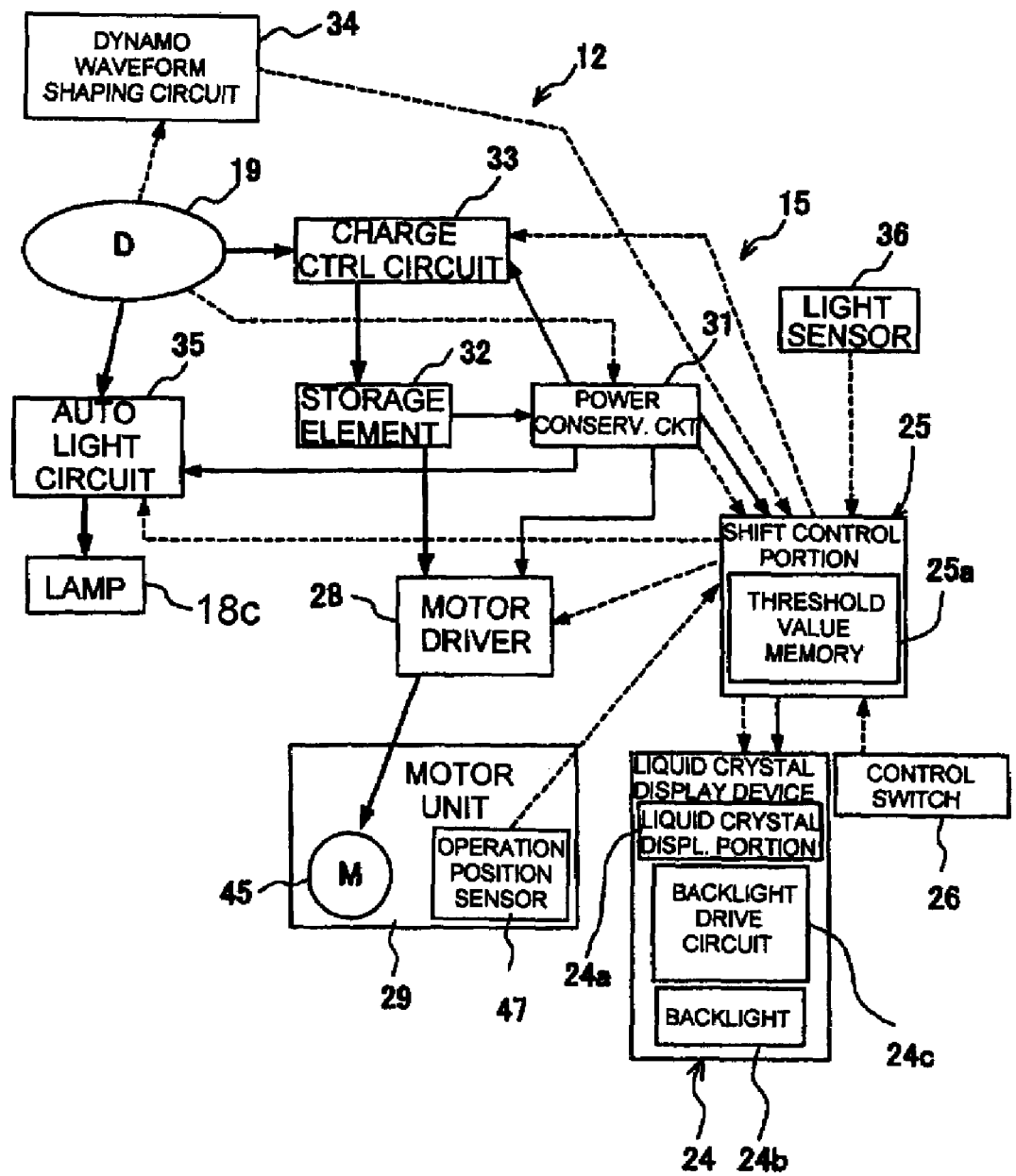
FIG. 6 is a schematic block diagram of the overall bicycle control system.

FIG. 6 is a block diagram illustrating the structure of the overall bicycle control system. Heavy lines in FIG. 6 indicate lines carrying about 1 A of current, solid lines indicate lines carrying about 5 mA of current, and dotted lines indicate signal lines. Control element 25 is operatively coupled to an operating switch 26 (which schematically represents the operating dial 23 and operating buttons 21 and 22 in the shift controller 20); to the liquid crystal display device 24; to a light sensor 36 (illumination sensor) for controlling the headlight 18a and tail light 18b, the internal shifting hub 10, and the liquid crystal display device 24; to a dynamo waveform shaping circuit 34 that generates a speed signal derived from the output of the alternating current dynamo 19, to a motor driver 28, to the position sensor 47 of the motor unit 29, and to other input/output components. Control element 25 includes a threshold value memory 25a that stores the threshold values shown in FIG. 7.

Control element 25 automatically controls shifting of the internal shifting hub 10 via motor driver 28 according to travel speed, and it controls the information displayed on the liquid crystal display device 24 disposed in the shift controller 20. The control element 25 also controls headlight 18a and tail light 18b by turning them on when surrounding light conditions fall below a certain prescribed brightness, and by turning them off when surrounding light conditions are above the prescribed brightness.

The liquid crystal display device 24 has a liquid crystal display unit 24a, a backlight 24b facing the liquid crystal display unit 24a, and a backlight driver circuit 24c for driving backlight 24b. Liquid crystal display unit 24a displays the current speed, the gearshift step and other information. The backlight 24b uses an LED that is capable of illumination with seven colors, for example. In this embodiment, the backlight 24b is switched on with a first light intensity L1 when the surrounding illumination is equal to or less than a predetermined brightness (e.g., 15 lux) and is switched off when the surrounding illumination equal to or greater than a predetermined brightness (e.g., 20 lux). During operation, backlight 24b may light up with a second light intensity L2 greater than the first light intensity L1 if brightness is below a predetermined level, and light up with the first light intensity L1 if brightness is above a predetermined level. In this way, power consumption can be minimized while maintaining good visibility during operation. Backlight 24b may be designed to light up for about 30 seconds, for example, when control button 21 or 22 is operated.

Figure 8:
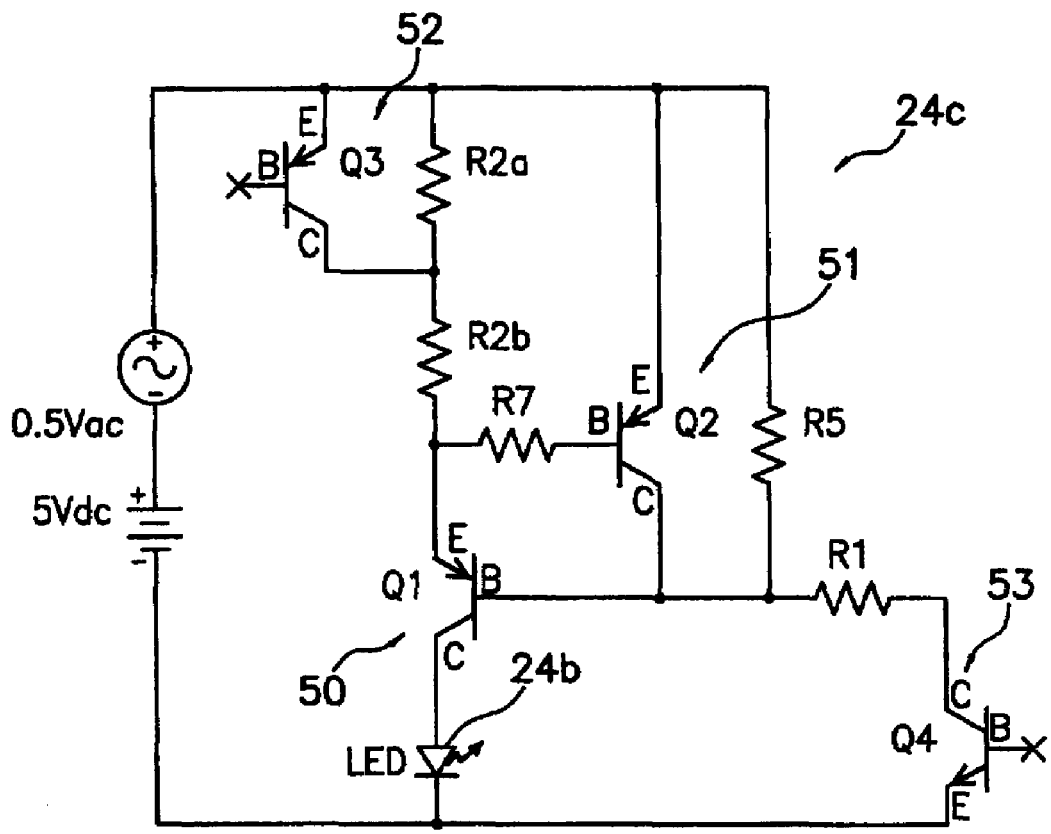
FIG. 8 is a schematic diagram of a particular embodiment of a backlight drive circuit.

Backlight driver circuit 24c may be operated by 5 V DC electricity supplied by a DC power supply, i.e. storage element 32, via power-saving circuit 31 and control element 25. The DC voltage supplied by the power supply may fluctuate up and down by about 0.5 V when the motor 45 or other load turns on and off, during charging, and so on. FIG. 8 is a schematic diagram of a particular embodiment of a backlight driver circuit 24c that operates well in such an environment. Backlight driver circuit 24c comprises a current supply circuit 50 for supplying DC current to backlight 24b; a current limiting circuit 51 for limiting current supplied to backlight 24b to a constant level; a light intensity switching circuit 52 for switching the light intensity of backlight 24b between two levels, and an on/off control circuit 53 for selectively turning backlight 24b on and off.

Current supply circuit 50 comprises a first bipolar transistor Q1 and a first resistor R1. Transistor Q1 is connected between the power source and backlight 24b, and resistor R1 is connected to the base terminal of transistor Q1 for properly biasing transistor Q1. Current limiting circuit 51 comprises a second bipolar transistor Q2, two serially connected second resistors R2a and R2b, and a seventh resistor R7. The emitter terminal of transistor Q2 is connected to the power supply, the collector terminal of transistor Q2 is connected to a node between the base terminal of transistor Q1 and resistor R1, and the base terminal of transistor Q2 is connected to one terminal of resistor R7. The other terminal of resistor R7 is connected to a node between resistor R2b and the emitter terminal of transistor Q1. The terminal of resistor R2a opposite resistor R2b is connected to the power supply. Resistor R7 will prevent excessive base current from flowing through the base terminal of transistor Q2 and possibly damaging transistor Q2 in case resistor R2a and/or R2b malfunctions. Light intensity switching circuit 52 comprises resistors R2a, R2b and a third bipolar transistor Q3. The emitter terminal of transistor Q3 is connected to the power supply, and the collector terminal of transistor Q3 is connected to a node between resistor R2a and R2b. On/off control circuit 53 comprises a fourth bipolar transistor Q4 and a fifth resistor R5. The collector terminal of transistor Q4 is connected to the terminal of resistor R1 opposite the base terminal of transistor Q1, and the emitter terminal of transistor Q4 is connected to the negative side of the power supply. One terminal of resistor R5 is connected to the positive side of the power supply, and the other terminal of resistor R5 is connected to a node between resistor R1 and the base terminal of transistor Q1. Resistor R5 is provided to ensure that transistor Q1 turns completely off when the transistor Q4 turns off.

Backlight drive circuit 24c takes advantage of the characteristic of bipolar transistors to turn on when the voltage drop $V_{be}$ across the base and emitter of the bipolar transistor reaches approximately 0.6 V. More specifically, when the power supply voltage $V_{dc}$ is dropped at the node between resistors R1 and R5 so that $V_{be}$ (Q1) reaches approximately 0.6 V, then transistor Q1 turns on so that current flows to backlight 24b. Similarly, when the power supply voltage $V_{dc}$ is dropped at the base terminal of transistor Q2 by resistors R2a, R2b and R7 (assuming transistor Q3 is turned off) so that $V_{be}$ (Q2) reaches approximately 0.6 V, then transistor Q2 turns on. The voltage $V_b$ at the base terminal of transistor Q2 will be equal to $V_{dc}-V_{be}$. Thus, the voltage drop across resistances R2a, R2b and R7 will be equal to $V_{dc}-(V_{dc}-V_{be})=V_{be}=$approximately 0.6V. As a result, the voltage drop across any of the resistances R2a, R2b and R7 will remain constant despite any fluctuation in the power supply voltage. Since the voltage drop across resistances R2a and R2b (assuming transistor Q3 is turned off) determines the current supplied to backlight 24b, the current supplied to backlight 24b also will remain constant despite any fluctuation in the power supply voltage. With this arrangement, constant current control can be carried out relatively inexpensively using bipolar transistors, deviation in current limit value is less than when field effect transistors are used, and current limit value can be set fairly high.

The light intensity of backlight 24b can be switched between two levels by selectively turning transistor Q3 on and off. More specifically, when the transistor Q3 turns on, only the resistance value of resistor R2b is applied to the operation of backlight 24b, thus causing the backlight 24b to light at second light intensity L2. When transistor Q3 is turned off, the sum of resistance values of the resistors R2a, R2b (R2a+R2b) is applied to the operation of backlight 24b, thus causing backlight 24b to light at light intensity L1 which is lower than light intensity L2. Light intensity switching circuit 52 and on/off control circuit 53 can be operated by signals from auto light circuit 35

A charging control circuit 33, a power storage element 32 (e.g., a capacitor), and an auto light circuit 35 are operatively coupled to the control element 25 via a power-saving circuit 31. A signal from the alternating current dynamo 19 is input to the power-saving circuit 31, and it is determined based on this signal whether or not the bicycle is stopped. The power saving circuit 31 supplies the control element 25, the motor driver 28, the charging control circuit 33 and the auto light circuit 35 with electrical power stored by the power storage element 32 when the bicycle is moving for the normal operation of these components, and it interrupts the supply of electrical power to these components when the bicycle is stopped to avoid needless expenditure of electrical power stored by the power storage element 32. Motor driver 28 operates on a 1 mA current supplied by the power-saving circuit 31, and it controls a 1 A current supplied by the power storage element 32 to operate the shifting motor 45.

The charging control circuit 33 comprises, for example, a half-wave rectifier circuit that rectifies an alternating current output from the alternating current dynamo 19 to 1 A and 5 mA direct currents (for example). The power storage element may 32 comprise, for example, a high-capacity capacitor that stores the direct current power that is output from the charging control circuit 33. The power storage element 32 also may comprise secondary batteries such as nickel cadmium batteries, lithium ion batteries, nickel-metal hydride batteries, etc., in lieu of a capacitor.

The dynamo waveform shaping circuit 34 forms a speed signal from the alternating current output from the alternating current dynamo 19. More specifically, a half-cycle is extracted from a sine wave alternating current signal, passed through a Schmitt circuit or other appropriate waveform shaping circuit, and formed into a pulse signal corresponding to speed. Control element 25 uses this signal to control the automatic shifting of the internal shifting hub 10 without requiring a separate speed sensor.

The auto light circuit 35 supplies or interrupts the 1A current output from the alternating current dynamo 19 to the headlight 18a and tail light 18b in response to on/off signal output from the control element 25. Control element 25 generates these signals based on the signals from the light sensor 36 in such a maimer that headlight 18a and tail light 18b are switched on automatically when light levels fall below a prescribed limit, and are is switched off when light levels exceed the prescribed limit. In this embodiment, headlight 18a and tail light 18b are operated from the alternating current dynamo 19 so that the current draw is less apt to adversely affect the power storage element 32, but this is not necessary.

Battery replacement and recharging are unnecessary because the power storage element 32 stores electrical power from the alternating current dynamo 19, and components such as the control element 25 are operated using this electrical power. Monitoring remaining battery power and carrying along spare batteries also become unnecessary, and shifting can be done automatically without performing the cumbersome procedures required by conventional power sources. The electrical power from the alternating current dynamo 19, which conventionally is not employed in the daytime, can be put to effective use in the shift control unit 12.

Bicycle speed is detected based on the alternating current signal output from the alternating current dynamo 19, and shifting is controlled according to the detected bicycle speed. Because alternating current dynamos generally have a plurality of circumferentially disposed magnetic poles, the alternating current dynamo outputs an alternating current signal with a frequency related to the bicycle speed and the number of magnetic poles. Consequently, it is possible to obtain a larger number of signal pulses from the alternating current signal during each wheel rotation in comparison with a speed signal obtainable, for example, from a conventional speed sensor that detects a magnet mounted to the bicycle wheel. Therefore, the bicycle speed can be accurately detected within the space of one wheel rotation, and shifting can be controlled in real time with high precision. Furthermore, since shifting is controlled based on the alternating current signal from the alternating current dynamo 19, it is no longer necessary to dispose the shift control unit 12 in the vicinity of the bicycle wheel. No limitation is placed on the mounting position of the shift control unit 12.

The operation of control element 25 may be understood from the flowcharts shown in FIGS. 9–12. When the power supply is switched on, the settings are initialized in step S1 of FIG. 9. For example, the wheel circumference for calculating the bicycle speed may be set to a diameter of 26 inches, and all process flags are reset.

A night flag NF is provided for discriminating between day and night. In this embodiment, the night flag NF is set to ON when the surrounding illumination IL is 15 lux or less, and it is set to OFF when the surrounding illumination is 20 lux or greater. More specifically, the illumination IL is read from the light sensor 36 in step S2. In step S3, a determination is made whether or not the night flag NF is already set to ON (=1). If the night flag NF is not set to ON, the process moves to step S4 and a determination is made whether or not the illumination IL is 15 lux or less. If the illumination is 15 lux or less, then the process moves to step S5, and the night flag NF is set to ON. If the illumination is greater than 15 lux, then this processing is skipped and the process moves to step S8.

If it is determined in step S3 that the night flag NF is already set to ON, then the process moves from step S3 to step S6. In step S6, a determination is made whether or not the illumination IL is 20 lux or greater. If the illumination IL is 20 lux or greater, then the process moves to step S7 and the night flag NF is set to OFF. If the illumination IL is less than 20, then step S7 is skipped and the process moves to step S8.

Figure 10:
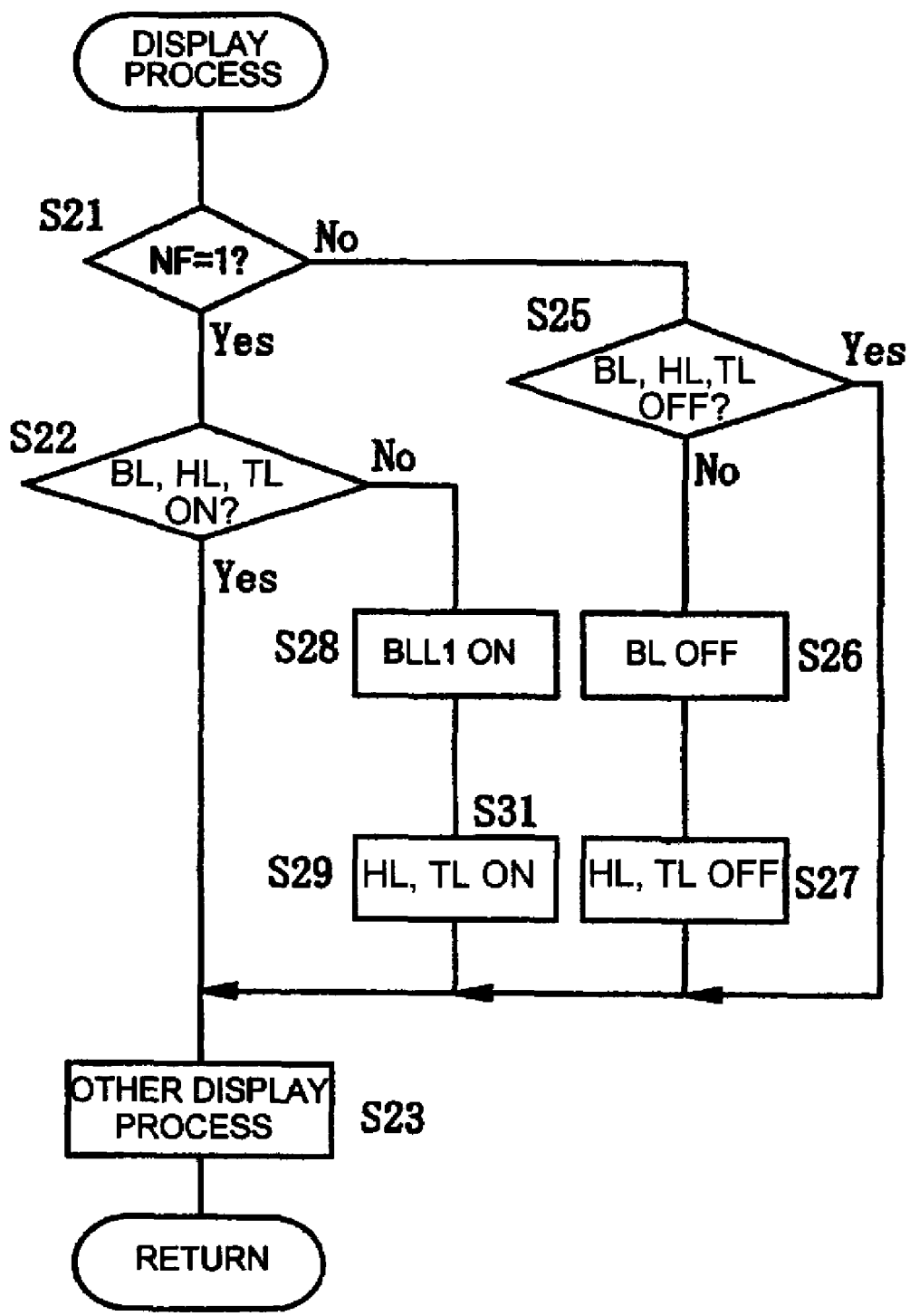
FIG. 10 is a flowchart of a particular embodiment of a display control process.

In step S8, a display processing routine shown in FIG. 10 is performed. In step S9, a determination is made whether or not the operating dial 23 has been set to the parking mode (P). If so, then the process moves from step S9 to step S15 to perform a parking processing routine. If not, then a determination is made in step S10 whether or not the operating dial 23 has been set to the automatic shifting mode (A1). If so, then the process moves from step S10 to step S16 to perform automatic shifting mode (A1) processing shown in FIG. 11. If not, then a determination is made in step S11 whether or not the operating dial 23 has been set to the automatic shifting mode (A2). If so, then the process moves from step S11 to step S17 to perform automatic shifting mode (A2) processing that is similar to automatic shift mode (A1) processing. If not, then a determination is made in step S12 whether or not the operating dial 23 has been set to the automatic shifting mode (A3). If so, then the process moves from step S12 to step S18 to perform automatic shifting mode (A3) processing that is similar to automatic shift mode (A1) processing. If not, then a determination is made in step S13 whether or not the operating dial 23 has been set to the manual mode (M). If so, then the process moves from step S13 to step S19 to perform manual mode (M) processing shown in FIG. 12. If not, then a determination is made in step S14 whether or not tire diameter input or some other processing has been selected. If so, then such other processing is performed in step S20.

In the display process of step S8, shown in FIG. 10, a determination is made whether or not the night flag NF is set to ON (=1) in step S21. When the night flag NF is set to ON (i.e., it is nighttime), a determination is made in step S22 whether or not backlight 24b, headlight 18a and tail light 18b are lighted. If so, then the process moves to step S23, various types of display processing are performed, and the process returns to the main routine. If not, then the process moves to steps S28 and S29, backlight 24b is lit to intensity L1, headlight 18a and tail light 18b are lighted, and the process moves to step S23. Thus, at or below a predetermined light intensity, if the night flag NF is on, then backlight 24b is illuminated dimly. Thus, the light intensity of backlight 24b is reduced even at night so that power consumption is further reduced.

If it is determined in step S21 that the night flag NF is set to OFF (i.e., it is daytime), the process moves from step S21 to step S25, and a determination is made whether or not backlight 24b, the headlight 18a and tail light 18b are turned off. If so, then the process moves to step S23. If not, then the process moves to steps S26 and S27, backlight 24b, headlight 18a and tail light 18b are turned off, and the process moves to step S23. Because the ON/OFF state of backlight 24b, headlight 18a and tail light 18b are set in accordance with the surrounding illumination, for example, it is easy to visually confirm various types of information in conjunction with the surrounding conditions, and various types of information can be displayed under advantageous display conditions on the liquid crystal display 24a.

In the parking processing of step S15, the internal shifting hub 10 is set in a locked state, and code registration processing for registering a code that releases the locked state of the internal shifting hub 10, code input processing for releasing the locked state, code verification processing for performing a verification, and other types of processing are executed in accordance with the operation of the operating buttons 21 and 22.

Figure 11:
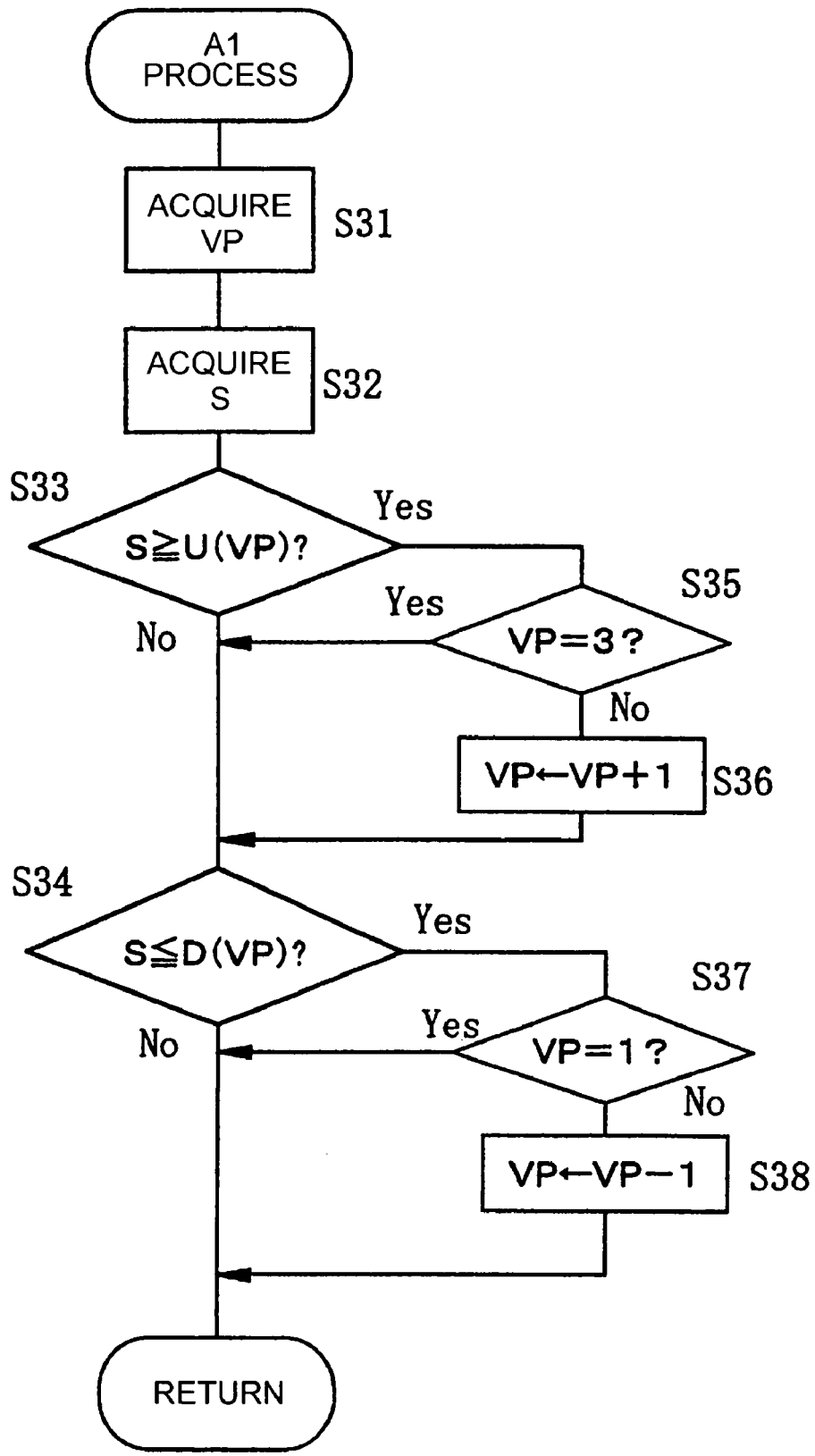
FIG. 11 is a flowchart of a particular embodiment of an automatic gear shifting process.

In the automatic shifting mode (A1) processing shown in FIG. 11, a gear position value VP is set to the gear position that corresponds to the bicycle speed S. When the actual gear position does not agree with this value, then the internal shifting hub 10 is shifted in the appropriate direction one step at a time. More specifically, the gear position value VP is read from the position sensor 47 in step S31, and the current bicycle speed S is determined from the speed signal from the alternating current dynamo 19 in step S32. In step S33, a determination is made whether or not the bicycle speed S exceeds the upshift threshold value U (VP) (FIG. 7) that corresponds to the gear position value VP. In step S34, a determination is made whether or not the bicycle speed S is less than the downshift threshold value D (VP) that corresponds to the gear position value VP.

If the current bicycle speed S exceeds the upshift threshold value U (VP) that corresponds to the current gear position shown in FIG. 7, then the process moves from step S33 to step S35. For example, when the gear position corresponds to second gear (VP=2), the process moves from step S33 to step S35 when the bicycle speed S is greater than 22.6 km/h. In step S35, a determination is made whether or not the gear position corresponds to third gear. If so, then the process moves to step S34 without any processing because shifting higher than this is not possible. If the gear position is less than third gear, then the process moves to step S36, the gear position value VP is increased by one in order to upshift the internal shifting hub by one step, and the process moves to step S34.

If the current bicycle speed S is below the downshift threshold value D (VP) that corresponds to the current gear position shown in FIG. 7, then the process moves from step S34 to step S37. For example, when the gear position corresponds to second gear (VP=2), the process moves from step S34 to step S37 when the bicycle speed S is less than 15.2 km/h. In step S37, a determination is made whether or not the gear position is first gear. If the gear position is first gear, then the process returns to the main routine without any further processing. If the gear position is equal to or greater than second gear, then the process moves to step S38, the gear position value VP is lowered by one in order to downshift the internal shifting hub 10 by one step, and the process returns to the main routine.

Figure 9:
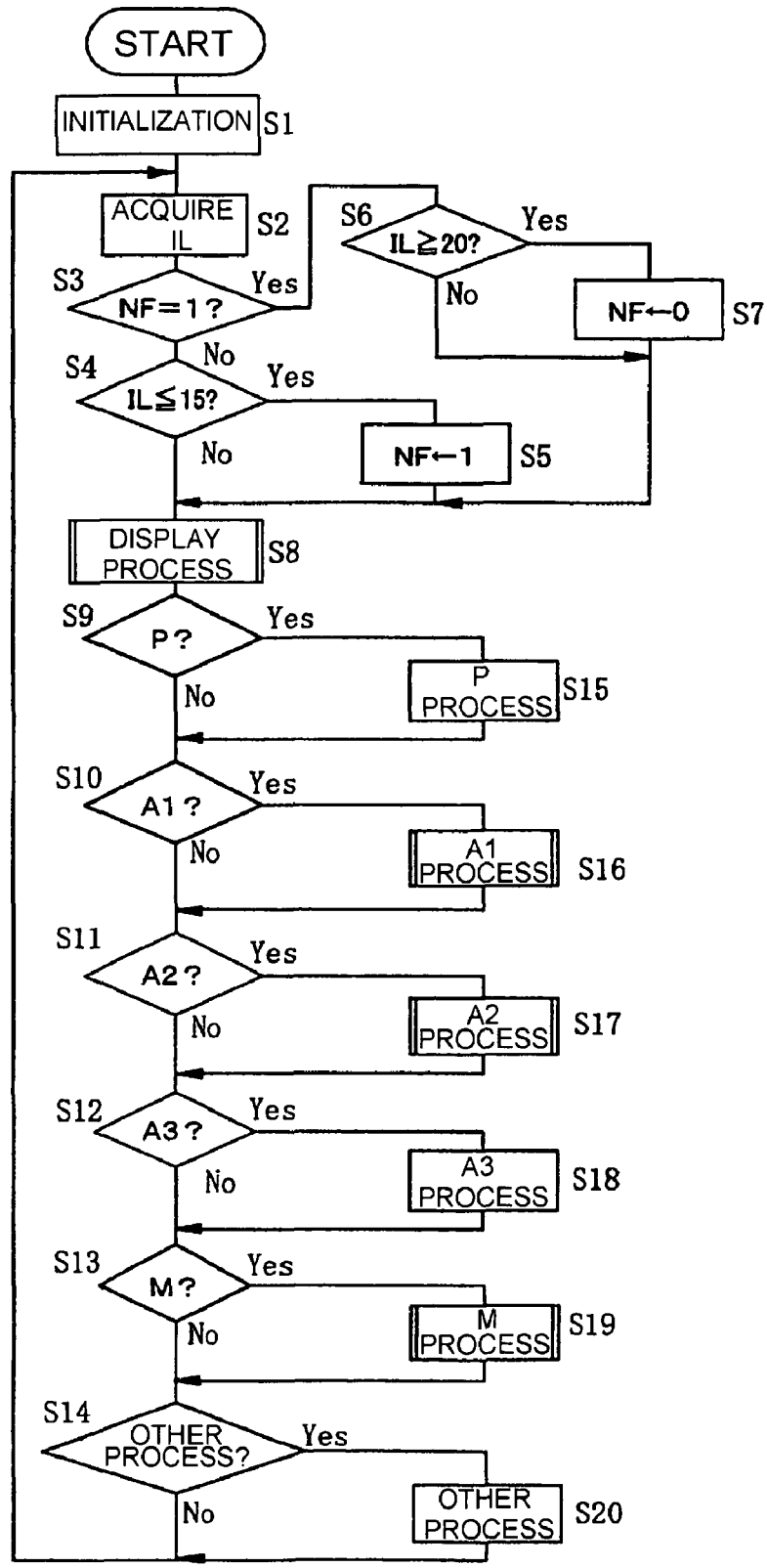
FIG. 9 is a flowchart of a particular embodiment of a main routine for the bicycle control system.

The automatic shifting mode (A2) processing of step S17 in FIG. 9 as well as the automatic shifting mode (A3) processing of step S18 are similar to automatic shifting mode (A1) processing except for the use of different threshold values. Accordingly, a detailed description of those processes will be omitted.

Figure 12:
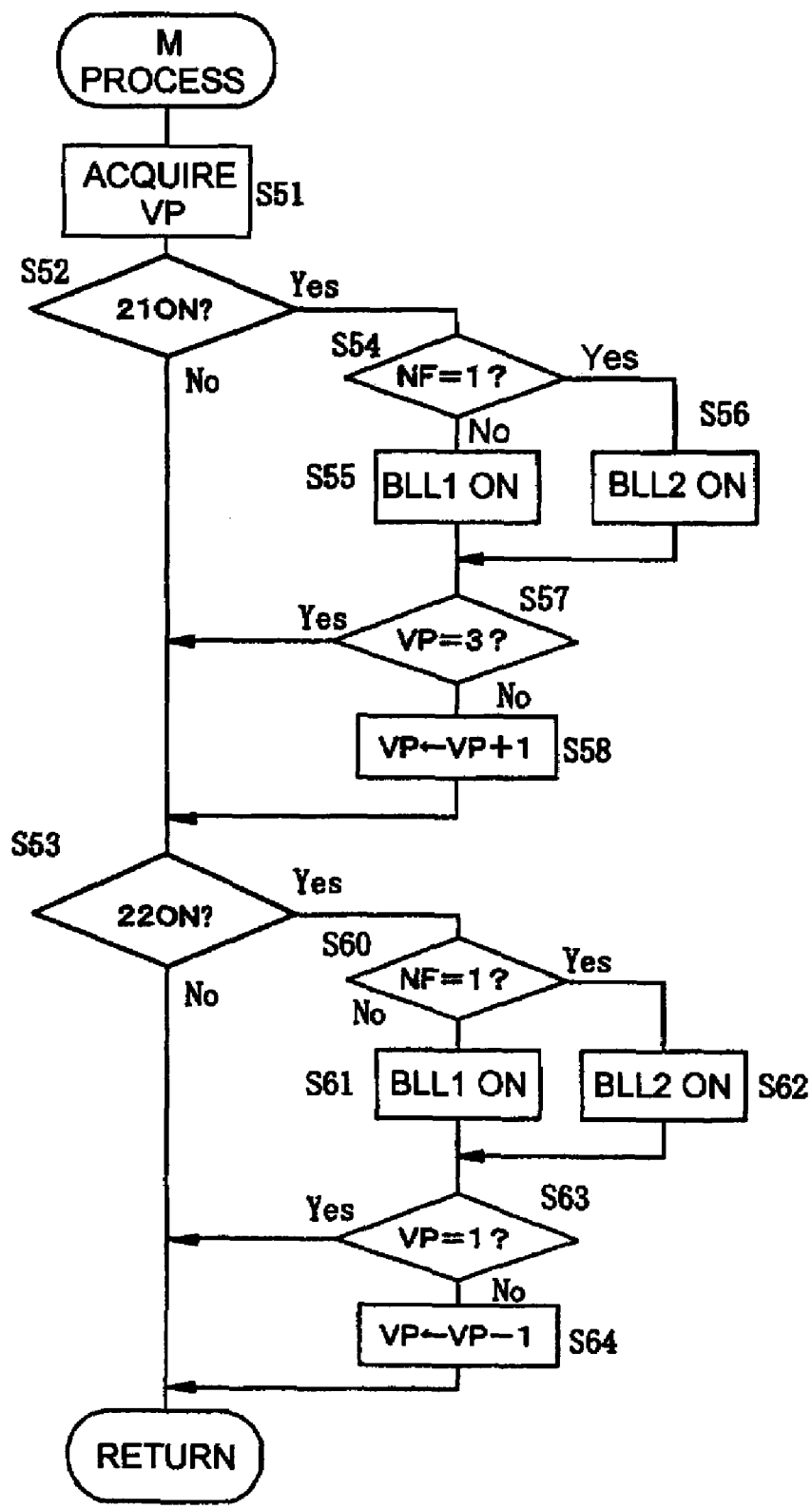
FIG. 12 is a flowchart of a particular embodiment of a manual gear shifting process.

In the manual mode (M) processing shown in FIG. 12, the internal shifting hub 10 is shifted one step at a time by the operation of the operating buttons 21 and 22. More specifically, the gear position value VP is read from position sensor 47 in step S51. In step S52, a determination is made whether or not the operating button 21 has been operated, and in step S53, a determination is made whether or not the operating button 22 has been operated. If the operating button 21 has been operated, then the process moves from step S52 to S54, and a determination is made whether or not the night flag NF is on (i.e., whether it is night time). If it is daytime, then the process moves from step S54 to step S55, wherein backlight (BL) 24b is turned on at light intensity L1 (dim light intensity). If it is nighttime, then the routine moves from step S54 to step S56, wherein backlight 24b is turned on at light intensity L2 (bright light intensity). Backlight 24b may be turned on for 30 seconds, for example. In other words, in step S55 transistor Q4 in on/off control circuit 53 is turned on for 30 seconds, and in step S56 transistor Q4 in on/off control circuit 53 is turned on for 30 seconds and transistor Q3 in light intensity switching circuit 52 also is turned on for 30 seconds.

In step S57 it is determined from the current gear position value VP whether or not the internal shifting hub 10 is in third gear. If the internal shifting hub 10 is not in third gear, then the process moves to step S58 wherein the gear position value VP is incremented by one gear position and the internal shifting hub 10 is upshifted accordingly. If the internal shifting hub 10 currently is in third gear, then this processing is skipped.

If the operating button 22 has been operated, then the process moves from step S53 to S60. In steps S60–S62 a backlight control process analogous to that of steps S54–S56 is performed. In step S63 a determination is made from the current gear position value VP whether or not the internal shifting hub 10 is in first gear. If the internal shifting hub 10 is not in first gear, then the process moves to step S64, the gear position value VP is decreased by one gear position and the internal shifting hub 10 is downshifted accordingly. If the internal shifting hub 10 currently is in first gear, then this processing is skipped.

Thus, the ON/OFF state of the backlight 24b is controlled in the present embodiment in accordance with daytime and nighttime, and backlight 24b also lights up in response to the operation of operating buttons 21 and 22. As a result, various types of information can be displayed advantageously in conjunction with the surrounding conditions, and inputs can be verified reliably.

While the above is a description of various embodiments of the present invention, further modifications may be employed without departing from the spirit and scope of the present invention. For example, a dynamo hub was used as an exemplary power supply, but an ordinary dynamo that is brought into contact with the rim or the tire could be used instead.

Figure 13:
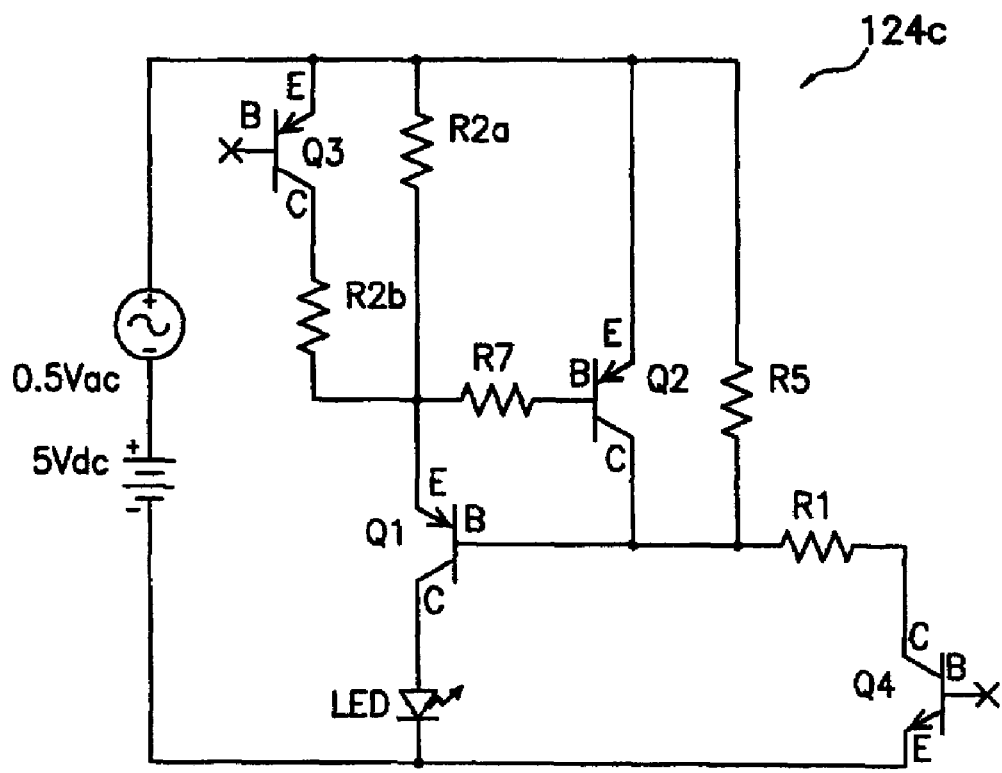
FIG. 13 is a schematic diagram of another embodiment of a backlight drive circuit.

In the embodiment described above, the resistances R2a, R2b in backlight drive circuit 24c were serially connected. However, as shown in FIG. 13, resistors R2a, R2b could be connected in parallel, with the transistor Q3 connected in series with resistor R2b.

Figure 14:
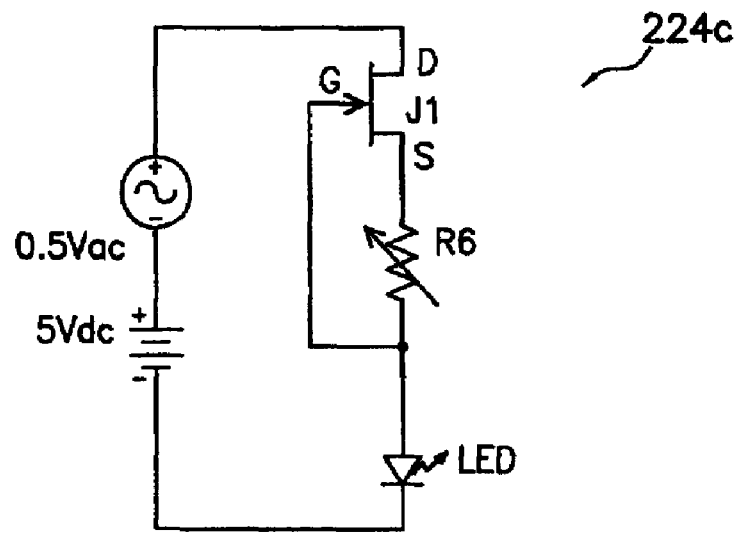
FIG. 14 is a schematic diagram of another embodiment of a backlight drive circuit.
Figure 15:
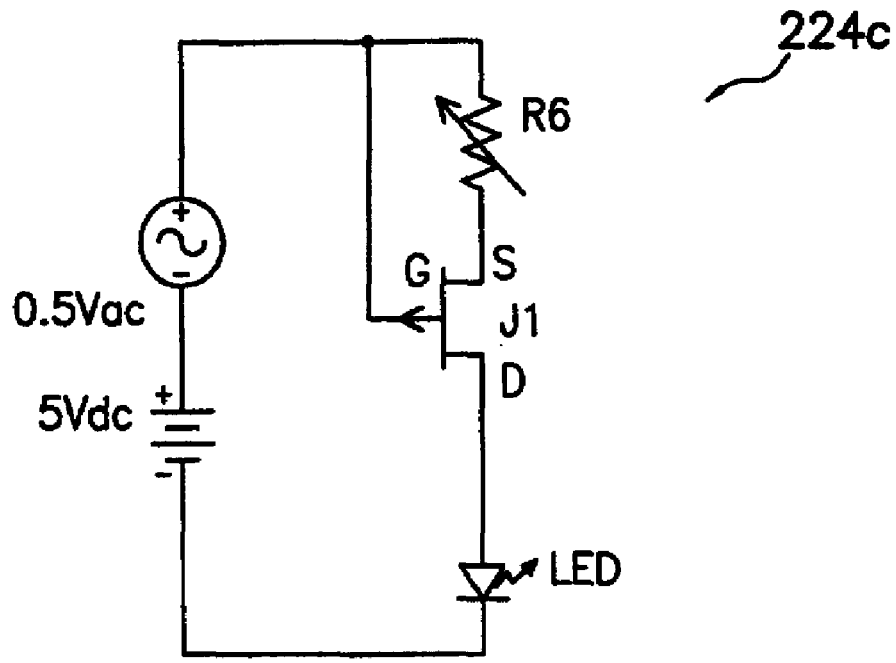
FIG. 15 is a schematic diagram of another embodiment of a backlight drive circuit.

As shown in FIGS. 14 and 15, backlight drive circuit 224c could be constructed using an N or P channel field effect transistor J1. This arrangement utilizes the ability of the junction field effect transistor to allow maximum current flow when the potential difference across the gate and source terminals is zero, and to set current to a predetermined value in response to a selected potential difference across the gate and source terminals. In this embodiment, a resistance R6 disposed between the gate and source terminals creates a predetermined potential difference across the gate and source terminals, thus limiting the electrical current flowing between the drain and source terminals. In this embodiment, the current supply circuit and current limiting circuit can be realized as a single element, whereby fluctuations in current flowing to backlight 24b can be reduced with a small number of components.

Figure 16:
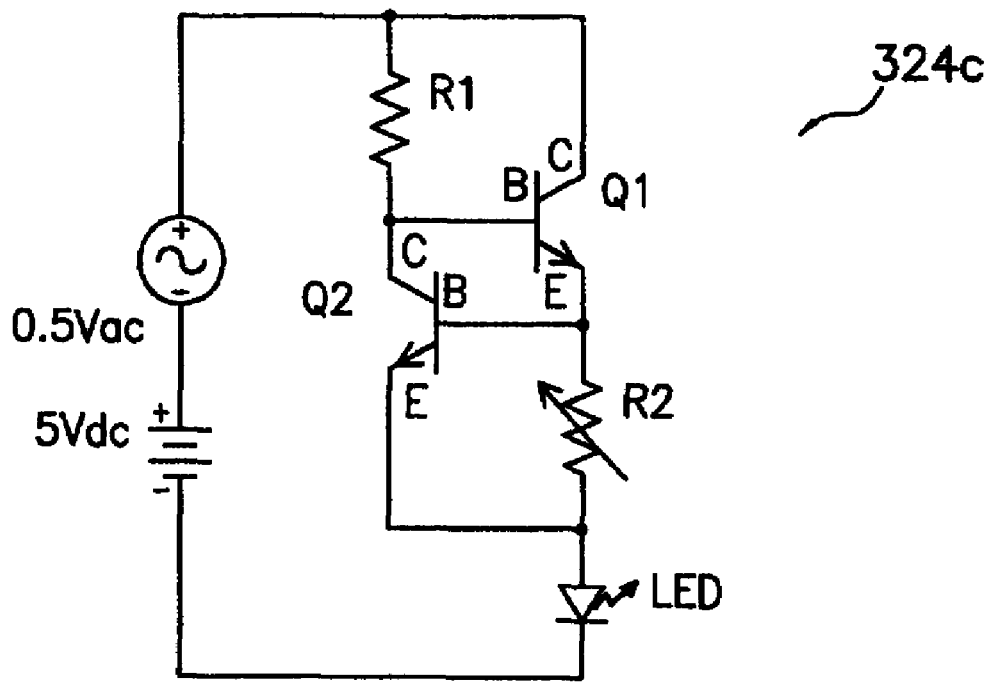
FIG. 16 is a schematic diagram of another embodiment of a backlight drive circuit.
Figure 17:
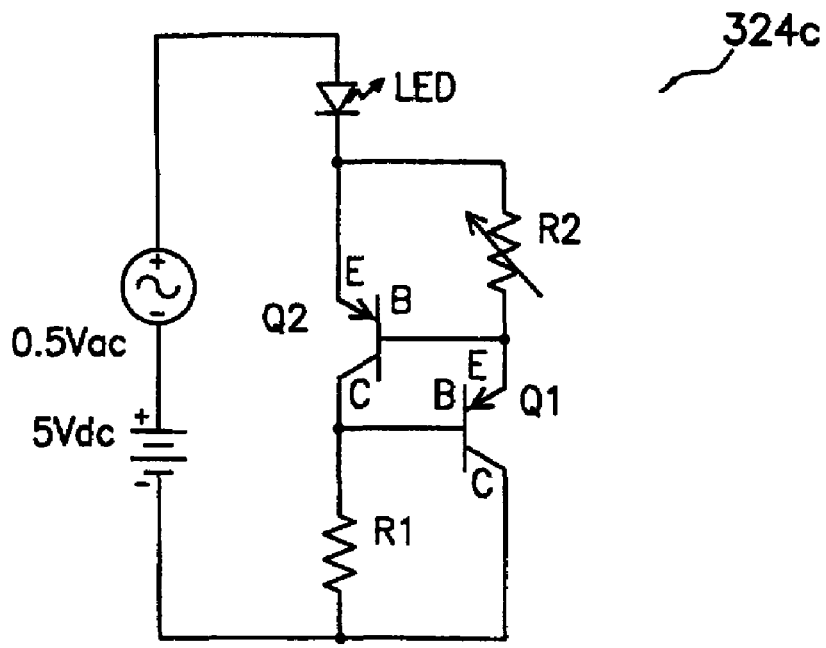
FIG. 17 is a schematic diagram of another embodiment of a backlight drive circuit.

As shown in FIGS. 16 and 17, backlight drive circuit 324c could be constructed using NPN or PNP bipolar transistors Q1, Q2 without performing on/off or light intensity switching. The architecture and operation in this case will be analogous to that in the preceding embodiment and need not be described here.

In the embodiment described above, a backlight 24b for a liquid display device 24 is described by way of an exemplary lighting device. However, the circuitry could be used with other lighting devices such as headlight or tail light 18b, for example.

Figure 18:
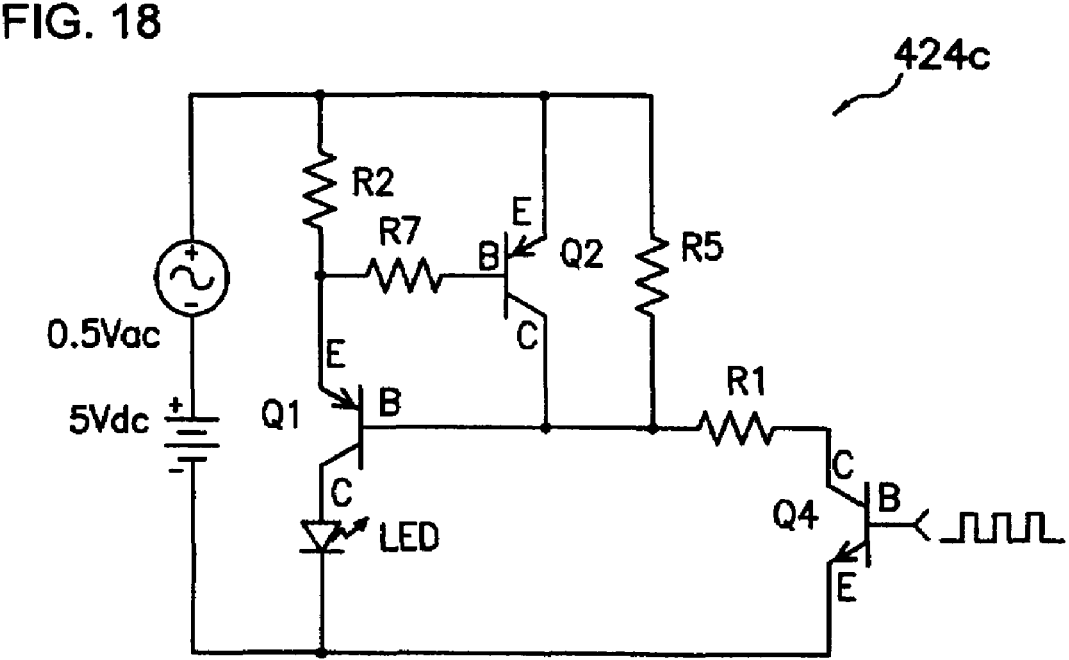
FIG. 18 is a schematic diagram of another embodiment of a backlight drive circuit.

In the embodiment described above, an LED was used as an exemplary light source, but a bulb with a filament could be used instead. Where a light bulb is used as the light source, a signal of about 60 Hz could be applied from a pulse wave modulation (PWM) circuit to the base terminal of transistor Q4 in the on/off control circuit of a drive circuit 424c shown in FIG. 18. In this embodiment, the light intensity of the light source will be lower due to being normally on, but the on/off ratio (duty ratio) of the PWM circuit can be varied to adjust light intensity so as to give relatively good energy efficiency. Thus, in contrast to the circuit shown in FIG. 8, a circuit for switching light intensity between two levels is not provided in this embodiment.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A circuit for providing electrical current to a bicycle lighting device that provides external illumination to an area around the bicycle, wherein the circuit comprises:
   a current supply circuit that supplies DC current from a power supply to the bicycle lighting device along a current path, wherein the current supply circuit comprises a first transistor having input and output current flowing terminals structured to flow current from the power supply through the bicycle lighting device in response to signals applied to a control terminal of the first transistor; and
   a current limiting circuit comprising:
      a second transistor having input and output current flowing terminals and a control terminal, wherein current flowing through the input and output current flowing terminals is communicated to the control terminal of the first transistor for controlling current flowing through the input and output current flowing terminals of the first transistor; and
      a resistance coupled in series with the input and output current flowing terminals of the first transistor and with the control terminal of the second transistor;
      wherein a voltage from the power supply is input to the resistance and to one of the input and output current flowing terminals of the second transistor such that a voltage applied to the control terminal of the second transistor through the resistance remains substantially constant in response to voltage fluctuations of the power supply so that substantially constant current flows through the input and output terminals of the first transistor.

2. The circuit according to claim 1 further comprising a varying circuit that varies an amount of current limiting provided by the current limiting circuit.

3. The circuit according to claim 2 wherein the varying circuit varies an amount of current limiting provided by the current limiting circuit by a plurality of discrete values.

4. The circuit according to claim 3 wherein the varying circuit comprises:
   a first resistance applied to the current limiting circuit;
   a second resistance applied to the current limiting circuit and coupled in series with the first resistance; and
   a switch that selectively bypasses the first resistance so that only the second resistance is applied to the current limiting circuit.

5. The circuit according to claim 4 wherein the switch comprises a transistor coupled to a node between the first resistance and the second resistance.

6. The circuit according to claim 3 wherein the varying circuit comprises:
   a first resistance applied to the current limiting circuit;
   a second resistance applied to the current limiting circuit and coupled in parallel with the first resistance; and
   a switch that selectively bypasses the first resistance so that only the second resistance is applied to the current limiting circuit.

7. The circuit according to claim 6 wherein the switch comprises a transistor coupled in parallel with one of the first resistance or the second resistance and in series with the other one of the first resistance or the second resistance.

8. The circuit according to claim 2 wherein the varying circuit varies an amount of current limiting provided by the current limiting circuit in a continuous manner.

9. The circuit according to claim 1 further comprising an on/off control circuit coupled to the current supply circuit for selectively switching the current supply circuit on and off.

10. The circuit according to claim 1 further comprising the bicycle lighting device, wherein the bicycle lighting device comprises an LED coupled for receiving the current from the current supply circuit.

11. The circuit according to claim 1 further comprising the bicycle lighting device, wherein the bicycle lighting device comprises a light bulb that includes a filament coupled for receiving the current from the current supply circuit.

12. The circuit according to claim 1 further comprising the bicycle lighting device, wherein the bicycle lighting device comprises a backlight for a liquid crystal display device that is structured to be mounted to the bicycle, wherein the backlight is coupled for receiving the current from the current supply circuit.

13. The circuit according to claim 1 further comprising the bicycle lighting device, wherein the bicycle lighting device comprises a headlight structured to be mounted to the bicycle, wherein the headlight is coupled for receiving the current from the current supply circuit.

14. The circuit according to claim 1 further comprising the bicycle lighting device, wherein the bicycle lighting device comprises a tail light structured to be mounted to the bicycle, wherein the tail light is coupled for receiving the current from the current supply circuit.

15. The circuit according to claim 1 wherein the current supply circuit and the current limiting circuit are structured to receive a DC signal obtained by rectifying an AC signal derived from a dynamo.

16. The circuit according to claim 1 wherein the first transistor comprises a first bipolar transistor, and wherein the second transistor comprises a second bipolar transistor.

17. The circuit according to claim 16 wherein a voltage arising from a base-emitter voltage of the second transistor is applied to the current path.

18. The circuit according to claim 17 wherein the voltage arising from the base-emitter voltage of the second transistor is applied to a node between the resistance and the first transistor.

19. The circuit according to claim 18 wherein the voltage arising from the base-emitter voltage of the second transistor is applied to a node in a current path through the resistance and collector and emitter terminals of the first transistor.

20. The circuit according to claim 19 wherein the resistance comprises:
   a first resistance; and
   a second resistance coupled in series with the first resistance.

21. The circuit according to claim 20 further comprising a switch for selectively bypassing the first resistance so that only the second resistance is disposed in the current path.

22. The circuit according to claim 21 wherein the switch comprises a transistor coupled to a node between the first resistance and the second resistance.

23. The circuit according to claim 19 wherein the resistance comprises:
   a first resistance; and
   a second resistance coupled in parallel with the first resistance.

24. The circuit according to claim 23 further comprising a switch for selectively bypassing the first resistance so that only the second resistance is disposed in the current path.

25. The circuit according to claim 24 wherein the switch comprises a transistor coupled in parallel with one of the first resistance or the second resistance and in series with the other one of the first resistance or the second resistance.

26. The circuit according to claim 19 wherein the second transistor has a base terminal coupled to the current path and a collector terminal coupled to a base terminal of the first bipolar transistor.

* * * * *